Feb. 26, 1957           F. A. KURKA           2,783,079
COLLAPSIBLE CAMPING TRAILER
Filed March 24, 1954           4 Sheets-Sheet 1
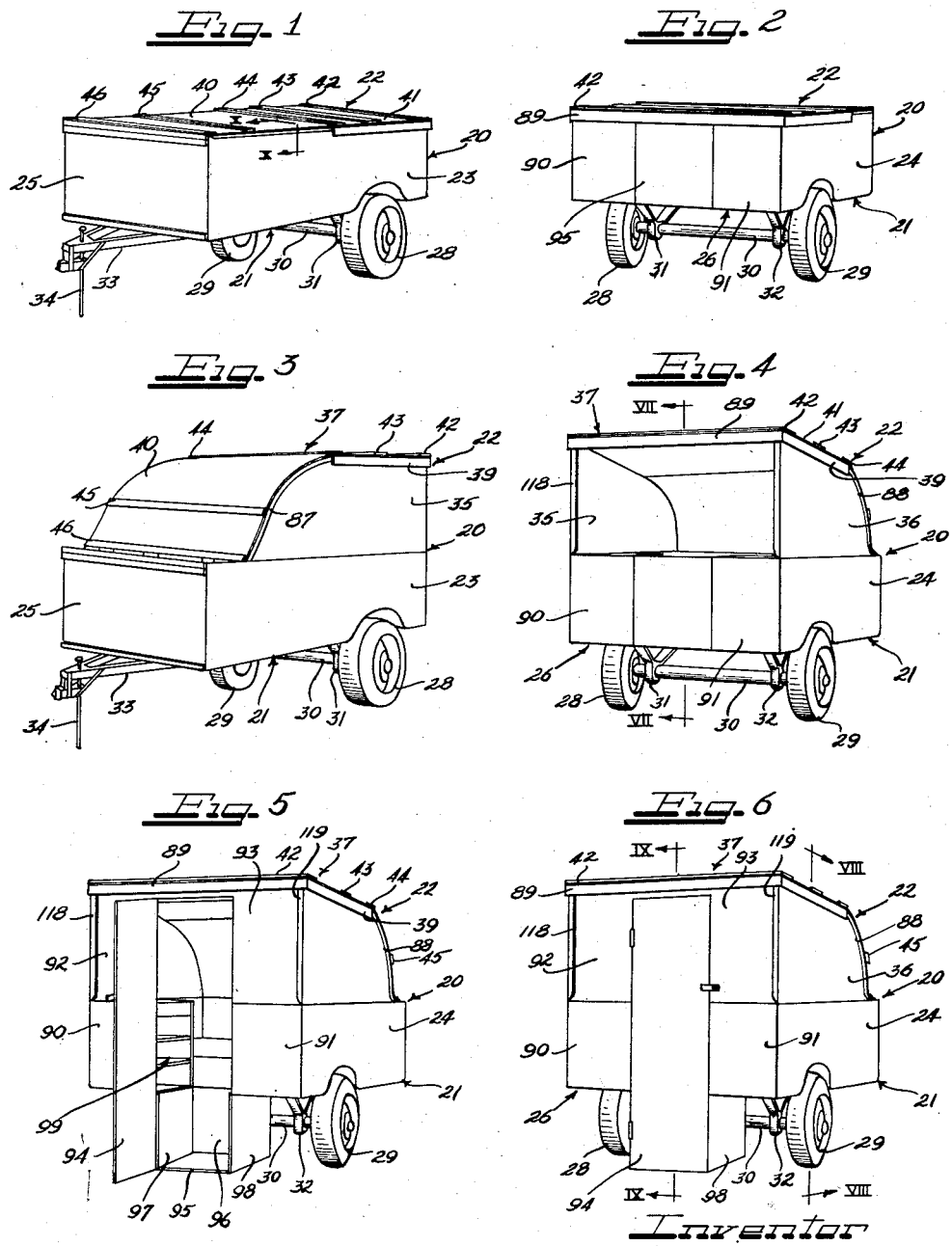
Inventor
FRANCIS A. KURKA

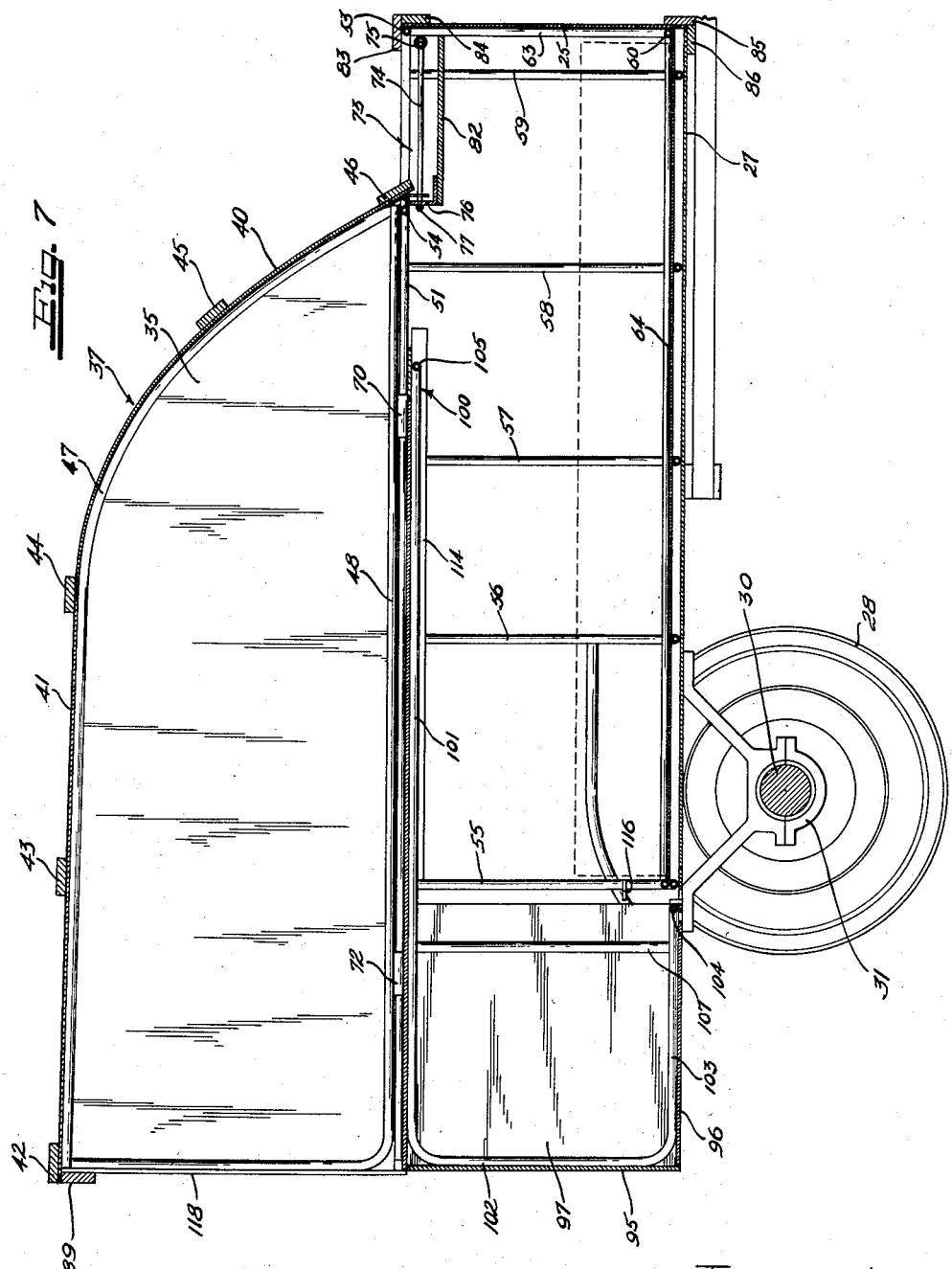

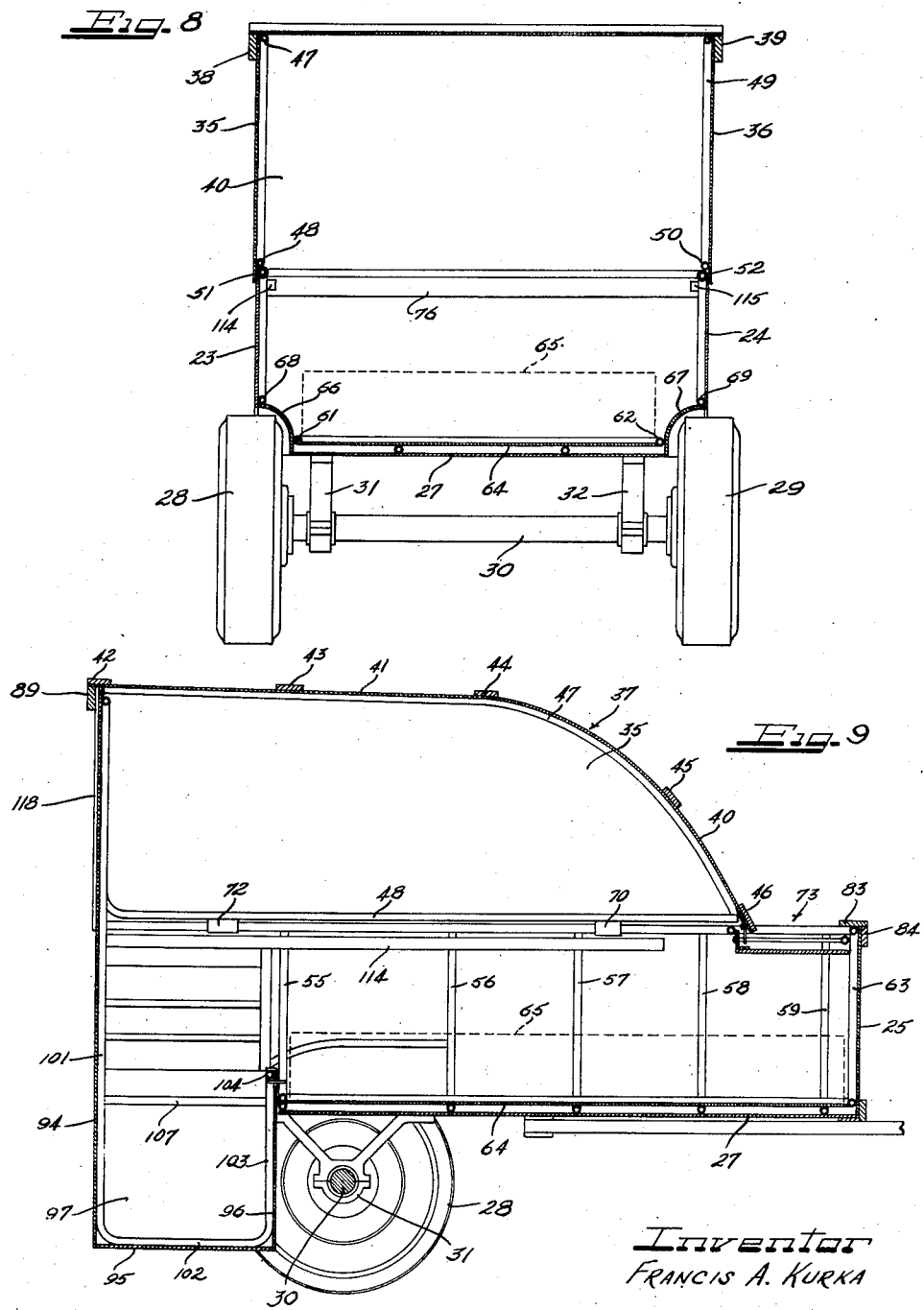

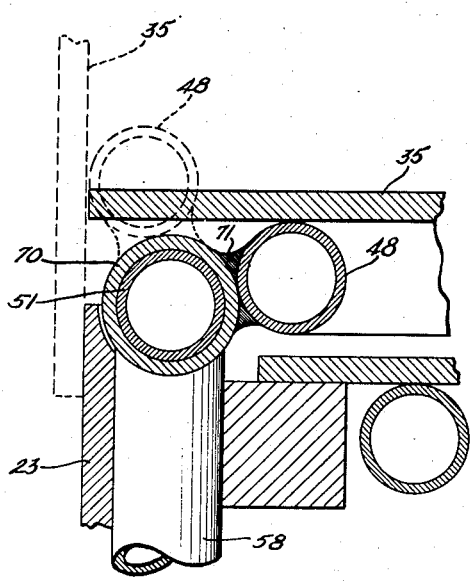
Fig. 10
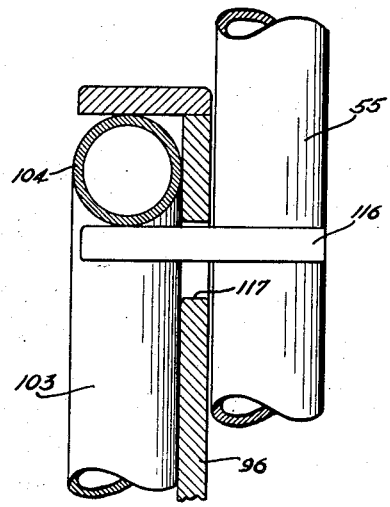
Fig. 11
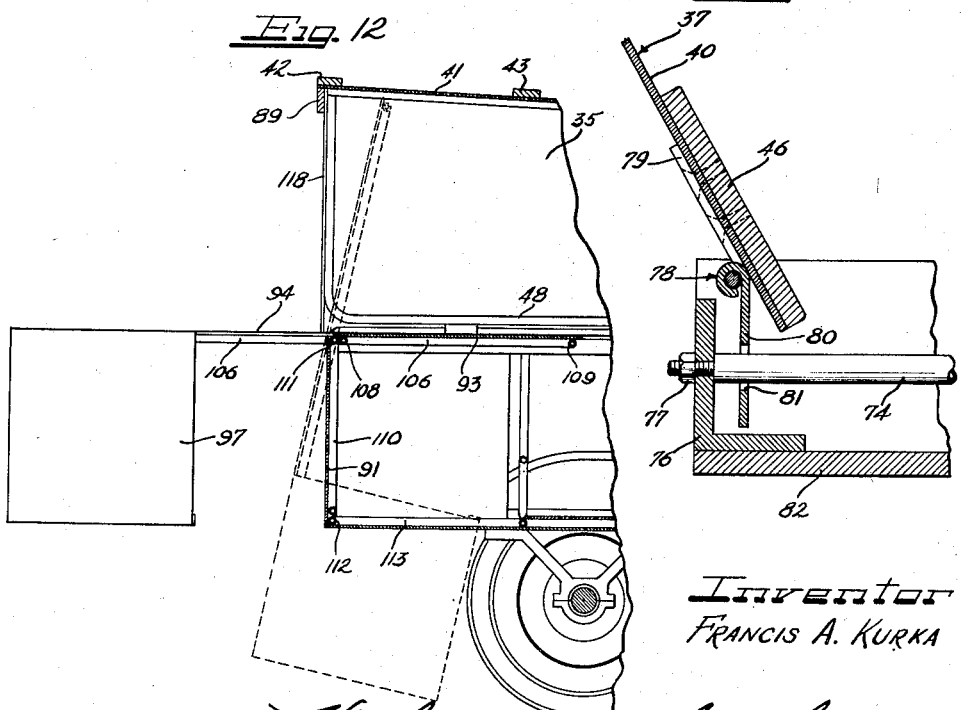
Fig. 12
Fig. 13
Inventor
Francis A. Kurka United States Patent Office 2,783,079
Patented Feb. 26, 1957

2,783,079

COLLAPSIBLE CAMPING TRAILER

Francis A. Kurka, Wauconda, Ill.

Application March 24, 1954, Serial No. 418,293

4 Claims. (Cl. 296—23)

In automobile travel, particularly on vacation trips, fishing trips and the like, sleeping accommodations, when available at all, are usually both inconvenient and expensive.

This invention provides a portable collapsible sleeping room which can be readily transported by automobile so that convenient sleeping accommodations are always available whenever and wherever desired.

Most preferably, the room may be provided with wheels to form a trailer readily attached to and pulled by the automobile.

According to an important feature of the invention, the sleeping room comprises a mattress-receiving enclosure which may have a generally rectangular box-like construction and which has a foldable waterproof top structure. By unfolding the top structure, there is provided sufficient space for access to the mattress for sleeping.

To provide the foldable top structure, the sides of the mattress-receiving enclosure may have lower fixed sections with upper sections hinged to the lower fixed sections, the upper sections being normally turned inwardly over the mattress but being unfoldable to vertical positions to define extensions of the fixed lower side sections.

A top disposed over the foldable upper side sections may have down-turned side flanges to limit outward movement of the hinged upper side sections and to provide watersheds or eaves.

Both ends of the enclosure may, like the side portions, be foldable. Preferably, however, and in accordance with a specific feature of the invention, only one end of the enclosure need be foldable and the top may be sloped downwardly toward the other end thereof. Most preferably, the edges of the upper hinged side sections may be smoothly curved and the top may be formed at least in part of a flexible material to conform to the curved edges in the unfolded positions of the upper side sections.

It will be apparent that with the top structure folded, the top may extend for the full length of the enclosure but when unfolded, the top is sloped and cannot extend for the full length of the enclosure. In accordance with a specific feature of the invention, means are provided for guiding the end of the downwardly sloped portion of the top between a position adjacent the upper edge of the associated end wall of the enclosure, when the top structure is folded, and a second position spaced from such upper edge when the top structure is unfolded, such second position being such that the other end of the top is aligned with the end of the enclosure. Such other end of the top may preferably be provided with a down-turned flange to provide a watershed or eaves and also to provide a stop limiting movement of the top relative to the upper side sections. Thus, the position of the top is fixed when the top structure is unfolded.

In accordance with a further specific feature, a fixed horizontal top section underlies the end of a downwardly sloped portion of the top in said second position thereof and extends to the associated end wall so that the enclosure is completely covered with the top structure unfolded.

In accordance with a further feature of the invention, the enclosure may include a fixed end wall section with a movable end wall section movable between a generally horizontal folded position and a vertical position above and in alignment with the fixed section to form an extension thereof, and with a door hinged at one side of the movable end wall section, the door having a lower portion in alignment with the fixed section when closed.

Most preferably, the door may be disposed centrally of the end of the enclosure and fixed wall sections may be provided on either side of the door with a pair of movable end wall sections also on either side of the door.

With this arrangement, a door is provided and yet the enclosure is foldable with a minimum vertical dimension when folded.

Another feature of the invention is in the provision of a movable end wall section which, when the enclosure is folded, occupies the position adjacent the fixed end wall section, or sections, occupied by the door when the enclosure is unfolded. In the unfolded position of the enclosure, this end wall section may be disposed in a horizontal position below and in alignment with a generally rectangular opening in the bottom of the enclosure. This section forms a step. Also, by providing the opening in the bottom, additional space is provided for the feet when dressing or undressing.

Most preferably, there is a bottom section fixed to the last mentioned movable section and disposed in the rectangular opening in the bottom when the last mentioned movable end wall section is in the vertical folded position thereof.

This invention thus provides a readily constructed, sturdy and durable, portable, collapsible, completely enclosed sleeping rom which has a convenient door when unfolded and which has room for undressing and dressing therein and yet is very compact when folded, and which is portable and readily towed by automobile.

An object of this invention, accordingly, is to provide a portable collapsible enclosed sleeping room or the like.

Another object of this invention is to provide a portable collapsible enclosed sleeping room comprising a mattress-receiving enclosure having a folded top structure.

A further object of this invention is to provide a portable collapsible enclosed sleeping room having improved foldable top structure.

Still another object of this invention is to provide a portable enclosed sleeping room which is collapsible and yet has a door when unfolded.

A still further object of this invention is to provide a portable enclosed sleeping room which may be unfolded to provide sufficient space for dressing and undressing therein and yet is very compact when folded.

This invention contemplates other and more specific objects, features and advantages which will become more fully apparent from the following detailed description taken in conjunction with the accompanying drawings which illustrate a preferred embodiment and in which:

Figure 1 is a front perspective view of a collapsible trailer constructed according to the principles of this invention and disposed in closed or folded position;

Figure 2 is a rear perspective view of the trailer of Figure 1;

Figure 3 is a view similar to Figure 1 but with the top structure of the trailer unfolded;

Figure 4 is a view similar to Figure 2 but with the top structure unfolded;

Figure 5 is a rear perspective view similar to Figure 4 but with the rear end structure unfolded and with the door thereof open;

Figure 6 is a rear perspective view similar to Figure 5 but with the door closed;

Figure 7 is a longitudinal elevational sectional view through the trailer, taken substantially along the lines VII—VII of Figure 4;

Figure 8 is a sectional view looking forwardly with the trailer completely unfolded, taken substantially along lines VIII—VIII of Figure 6;

Figure 9 is a longitudinal elevational sectional view similar to Figure 7 but with the rearward end structure of the trailer unfolded, taken substantially along lines IX—IX of Figure 6;

Figure 10 is a sectional view taken along lines X—X of Figure 1 and illustrating in detail the hinge connection of the side sections;

Figure 11 is a detail view illustrating the means for locking the rearward end structure in position;

Figure 12 is a sectional view illustrating the method of unfolding the rearward end structure; and Figure 13 is a detail view illustrating the manner of connection of the forward end of the top to the mattress-receiving enclosure of the trailer.

Reference numeral 20 generally designates the collapsible trailer constructed according to the principles of this invention. The trailer 20 may comprise a generally rectangular box-like mattress-receiving enclosure 21 and a foldable top generally designated by reference numeral 22. The enclosure 21 may comprise side walls 23 and 24, a forward end wall 25, a foldable rear end structure generally designated by reference numeral 26, and a bottom 27. The bottom 27 may be supported in spaced relation to ground, or other supporting surface, by a pair of wheels 28 and 29 on an axle 30 carried by brackets 31 and 32 depending from the bottom 27. Any conventional wheel suspension may, of course, be utilized.

A coupling or hitch structure generally designated by reference numeral 33 may project forwardly from the under side of the bottom 27 for coupling the trailer 20 to the rear end of an automobile or the like. This coupling or hitch structure 33 may include a retractable post 34 for supporting the forward end of the trailer 20 in properly spaced relation to the supporting surface with the trailer unhitched from the automobile.

The foldable top structure 22 may preferably comprise a pair of upper side wall sections 35 and 36 respectively hinged to the fixed side wall sections 23 and 24 of the enclosure 21 and movable between generally horizontal folded positions over the mattress in the enclosure 21 and vertical unfolded positions in which they form extensions of the side wall sections 23 and 24. A top 37 overlies the foldable sections 35 and 36 and may have downturned side flanges 38 and 39 for limiting outward movement of the side wall sections 35 and 36, respectively, and to provide eaves.

To eliminate the need for a foldable forward end wall structure, and to provide a streamlined effect in the event the trailer is pulled in its unfolded condition, the top 37 is sloped downwardly toward the forward end of the trailer. Most preferably, the edges of the foldable side sections 35 and 36 are sloped downwardly in a smooth curve to align the points adjacent the upper edges of the sections 23 and 24 and spaced from the forward end of the trailer and the top 37 is formed at least in part of a flexible material conformable to the curved edges of the foldable side wall sections 35 and 36. Preferably, the top 37 may have a forward section 40 of a relatively flexible material and a rearward section 41 of a relatively rigid material. For example, the forward section 40 may be of a Masonite or a similar composition material having a thickness of one-eighth inch and the rearward section 41 may be of a plywood or other light strong material having a thickness of one-fourth inch. If desired, transverse rigidifying bars 42, 43, 44, 45 and 46 may be secured in longitudinal spaced relation against the upper surface of the top 37.

The side walls 35 and 36 may, for example, be of a plywood or similar material which may be rigidified by tubular steel members secured thereto around the peripheral edges thereof. For example, an upper tubular member 47 and a lower tubular member 48 may be secured to the side wall section 35, the upper member 47 having a forward end portion converged downwardly and secured to the forward end of the member 48, and the member 48 having a rearward end portion turned upwardly and secured to the rearward end of the upper member 47. Similar tubular members 49 and 50 may be used for rigidifying the side wall section 36.

The enclosure 21 may similarly be constructed of plywood on a frame of tubular steel members. For example, tubular members 51 and 52 may extend longitudinally along the inside of the upper edges of the side walls 23 and 24, respectively, with the transverse tubular member 53 extending between the forward ends of the members 51 and 52 and with a transverse member 54 extending between points on the members 51 and 52 spaced rearwardly from the member 53. The upper ends of the legs of a plurality of generally U-shaped tubular members 55, 56, 57, 58 and 59 are secured to the members 51 and 52, the bottom 27 being secured against the horizontal bight portions of the members 55–59. A horizontal generally U-shaped sub-frame has a transverse bight portion 60 underlying the member 53 and a pair of longitudinally extending leg portions 61 and 62 on top of and secured against the bight portions of the U-shaped members 55–59. Vertical strut members 63 may be secured between the members 53 and 60. A sheet of plywood or similar material 64 may be secured to the transverse bight portions of the U-shaped members 55–59 between the legs 61 and 62 for receiving a full sized mattress 65 as indicated in dotted lines. If desired, and preferably, a box spring and mattress combination may be used.

The enclosure 21 may have side recesses to receive the upper ends of the wheels 28 and 29 and provide a lower center of gravity. These may be defined by members 66 and 67 extending respectively between sides 23 and 24 and the bottom 27, as illustrated in Figure 8. Additional support bars 68 and 69 may extend above the members 66 and 67.

To hinge the upper side wall sections 35 and 36 to the lower fixed side wall sections 23 and 24, a hinge structure such as illustrated in detail in Figure 10 may be utilized. Referring thereto, a sleeve 70 may be rigidly secured to the tubular member 48 as through a welded joint as indicated by reference numeral 71 and may receive the tubular member 51 for rotation relative thereto. A second sleeve 72, similar to the sleeve 70, may be secured to the member 48 to receive the member 51, as shown in Figure 7, and a similar hinge connection may be provided between the tubular member 50 and the tubular member 52 to hinge the upper side section 36 to the fixed side section 24.

The top structure 22 folded, the top 37 preferably extends for the full length of the enclosure 21. Due to the slope of the top in its unfolded position, however, it cannot extend for the full length of the enclosure 21. In accordance with a specific feature of the invention, means generally designated by reference numeral 73 are provided for guiding the forward end of the top 37 between a position adjacent the upper end of the forward end wall 25 and a position spaced rearwardly therefrom. Such means 73 may comprise a plurality of bolts 74 extending from a member 75 secured to the vertical struts 63 adjacent the member 53 to a transverse member 76 of generally L-shaped cross-section, disposed adjacent the transverse tubular member 54. Nuts 77 are threaded on the ends of the bolts 74 to secure the same to the vertical leg of the transverse member 76. A plurality of hinges 78 are utilized to connect the forward end of the top 37 to the bolt 74. Each hinge 78 may have one plate 79 secured to the forward end of the top 37 with a secured plate 80 having an opening 81 to receive the associated bolt 74, as illustrated in detail in Figure 13. Thus there is a hinge connection between the forward end of the top 37 and the enclosure 21 and also a connection permitting relative longitudinal movement.

So that the enclosure 21 will be completely enclosed with the top structure 22 unfolded, a fixed top section 82 may underlie the forward end of the top 27 in its unfolded position and may extend to the forward end wall 25.

It might here be noted that the forward upper edge of the enclosure 21 may be reinforced by a pair of boards 83 and 84 or the like while the forward lower edge of the enclosure 21 may be reinforced by a similar pair of boards 85 and 86.

It should also be noted that the flexible portion 40 of the top 37 may be provided with flexible eaves 87 and 88 which may, for example, be made of a flexible elastomeric material such as rubber engageable with the outer surfaces of the upper side wall sections 35 and 36.

The rearward edge of the top 37 may be provided with an eave defined by a flange 89 which also serves to engage the rearward ends of the movable side wall sections 35 and 36 to prevent forward movement of the top 37. In the folded condition of the top structure 22, the flange 89 also serves to engage the rearward end of the enclosure 21 to prevent forward movement of the top 37. Important features of the invention reside in the construction of the foldable rearward end structure 26. This structure comprises at least one and preferably a pair of fixed separated end wall sections 90 and 91, and a pair of movable end wall sections 92 and 93 movable between generally horizontal folded positions and vertical unfolded positions forming extensions of the fixed end wall sections 90 and 91. A door 94 is hinged with respect to the movable end wall sections 92 and 93 and in its enclosed position it is aligned with all the sections 90–93.

The bottom 27 may preferably be provided with a generally rectangular opening aligned with and extending forwardly from the space between the fixed end wall sections 90 and 91. A movable end wall section 95 may be disposed in alignment with and between the fixed end wall sections 90 and 91 in the folded position of the rear end structure 26 and may be disposed below and in alignment with the rectangular opening in the bottom 27 in the unfolded condition of the rear end structure 26. In this unfolded condition, the section 95 provides a convenient step and a place to stand within the trailer with the door 94 closed.

A section 96 may be affixed at right angles to the section 95 to form a forward end wall for the spaces between the rectangular opening in the bottom 27 and the section 95, when the rear end structure 26 is unfolded, and also to provide a bottom for the enclosure 21 disposed in the rectangular opening of the fixed bottom 27 when the rearward end structure 26 is folded.

In addition, a pair of spaced parallel side members 97 and 98 may be provided so that the space between the opening in the bottom 27 and the section 95 may be completely enclosed in the unfolded condition of the rearward structure 26.

The rear end of the mattress 65 may extend to the forward end of the opening in the bottom 27 to leave a space in front of the fixed rearward end wall sections 90 and 91 on either side of such opening. These spaces may preferably be provided with storage shelves 99 or the like, as illustrated in Figure 5.

The sections 92, 93, 95, 96, 97 and 98 are preferably supported for movement as a unit. For this purpose, a member 100, which may preferably be of tubular steel, has an elongated portion 101 which extends along the right-hand edge of the section 92 at the left-hand edge of the door 94 downwardly along the rearward edge of the wall 97 (as viewed in Figure 5), a portion 102 extending forwardly along the junction between sections 95 and 97, a section 103 extending upwardly at the junction between sections 96 and 97 and a portion 104 extending along the upper edge of the section 96, all as viewed with the rearward end structure 26 in its unfolded condition as illustrated in Figure 5. The portion 104 and a portion 105 extending transversely from the upper end of the portion 101 are joined to portions similar to the portions 101, 102 and 103 disposed in the right-hand side of the door 94 (as viewed in Figure 5) to connect the sections 93, 95, 96 and 97. A portion 106, which corresponds to the portion 101, is illustrated in Figure 12. A reinforcing bar 107 may extend between the portions 101 and 103.

The sections 92 and 93 are supported from the spaced parallel portions 101 and 106 of the tubular member 100 by suitable frame members including members 108 and 109 along the lower and upper edges, respectively, of the section 93 (Figure 12) and similar members along the lower and upper edges of the section 92.

The fixed sections 90 and 91 may be supported from the frame of the enclosure 21 by tubular members including a member 110 along the left-hand edge of the section 91, as viewed from the rear, a member 111 along the upper edge of the section 91, a member 112 along the lower edge of the section 91, and a member 113 extending forwardly from the junction between members 110 and 112 along the right-hand edge of the opening in the bottom 27 to the bight portion of the U-shaped frame member 55.

In the folded condition of the rear end structure 26, the edge of the section 92 may rest on a track member 114 disposed in spaced parallel relation to, and slightly below, the frame member 51. The edge of the section 93 may rest on a track member 115 disposed adjacent the frame member 52. The assembly which includes the sections 92, 93, door 94 and sections 95–98, may then be moved rearwardly to a position as illustrated in Figure 12. This assembly may then be tilted counter-clockwise as viewed in Figure 12 with the tubular member 108 riding on the fixed tubular member 111 (and with similar tubular members being engaged at the opposite side of the door 94), the assembly being moved through the dotted line position illustrated in Figure 12 to the position illustrated in Figure 9.

To lock the assembly in position, a pin 116 affixed to the frame member 55 may extend through an opening 117 in section 96 below the transverse portion 104 of the tubular member 100. This structure cooperates with a pair of flanges extending inwardly from the rear edges of the upper hinged side sections 35 and 36, respectively, in the path of the edges of the sections 92 and 93, to fix the assembly in unfolded condition.

To fold up the collapsible trailer 20, the assembly which includes the door 94 and the sections 92, 93, 95, 96, 97 and 98 may be moved clockwise through the dotted line position of Figure 12 to the full line position of Figure 12 after which this assembly is moved forwardly with the edges of the sections 92 and 93 riding on the tracks 114 and 115, to put the assembly in the position illustrated in Figures 4 and 7. The side wall sections 35 and 36 may then be pivoted inwardly over the mattress 65 and the top 37 will automatically move downwardly under its own weight to the position as illustrated in Figure 1 and Figure 2. The trailer is then ready for travel.

This invention thus provides a readily constructed, sturdy and durable, portable, collapsible, completely enclosed sleeping room which has a convenient door when unfolded and which has ample room for undressing and dressing therein and yet is very compact when folded.

It will be understood that modifications and variations

I claim as my invention:

1. In a portable enclosed sleeping room or the like, a box-like structure including a bottom having a generally rectangular opening adjacent one end thereof and an end wall section having one edge in the same vertical plane as one edge of said rectangular opening means for supporting said bottom in spaced relation to a support surface, a movable end wall section, and means hinging said movable end wall section for swinging movement between a vertical position in coplanar alignment with said fixed end wall section and a horizontal position below and in alignment with said rectangular opening.

2. In a portable enclosed sleeping room or the like, a box-like structure including a bottom having a generally rectangular opening adjacent one end thereof and an end wall section having one edge in the same vertical plane as one edge of said rectangular opening means for supporting said bottom in spaced relation to a support surface, a movable end wall section, means hinging said movable end wall section for swinging movement between a vertical position in coplanar alignment with said fixed end wall section and a horizontal position below and in alignment with said rectangular opening, and a bottom section affixed to said movable section and disposed in said rectangular opening when said movable end wall section is in said vertical position thereof.

3. In a portable enclosed sleeping room or the like, a box-like structure including a bottom having a generally rectangular opening adjacent one end thereof and an end wall section having one edge in the same vertical plane as one edge of said rectangular opening means for supporting said bottom in spaced relation to a support surface, a movable end wall section, means hinging said movable end wall section for swinging movement between a vertical position in coplanar alignment with said fixed end wall section and a horizontal position below and in alignment with said rectangular opening, and a door hinged with respect to said movable end wall section and disposed in vertical position in alignment with said fixed end wall section when said movable end wall section is in said horizontal position thereof.

4. In a portable collapsible enclosed sleeping room, or the like, a mattress-receiving box-like structure enclosure including end wall sections, a pair of lower side wall sections, and a pair of upper rigid side wall sections hinged to said lower side wall sections for movement between generally horizontal folded positions and vertical unfolded positions, said upper side wall sections in said unfolded positions thereof having edges sloped downwardly in a smooth curve to aligned points spaced from one of said end wall sections, a flexible top overlying said upper side wall sections, means for guiding one end of said flexible top for movement between a position adjacent said one of said end wall sections with said upper side wall sections in said folded positions and a position adjacent said aligned points with said upper side wall sections in said unfolded positions, and a fixed top member underlying said aligned points and extending to said one of said end wall sections.

References Cited in the file of this patent

UNITED STATES PATENTS

| | | |
|---|---|---|
| 372,991 | Stone | Nov. 8, 1887 |
| 1,818,914 | Verdini | Aug. 11, 1931 |
| 1,917,824 | Burns | July 11, 1933 |
| 2,274,754 | Theisen | Mar. 3, 1942 |
| 2,298,619 | Gorton | Oct. 13, 1942 |
| 2,481,230 | MacDonald | Sept. 6, 1949 |

FOREIGN PATENTS

| | | |
|---|---|---|
| 20,208 | Australia | Nov. 11, 1934 |
| 1,015,230 | France | July 2, 1952 |